(No Model.)
T. A. COOK.
SHAFT AND BEARING.
No. 501,611. Patented July 18, 1893.
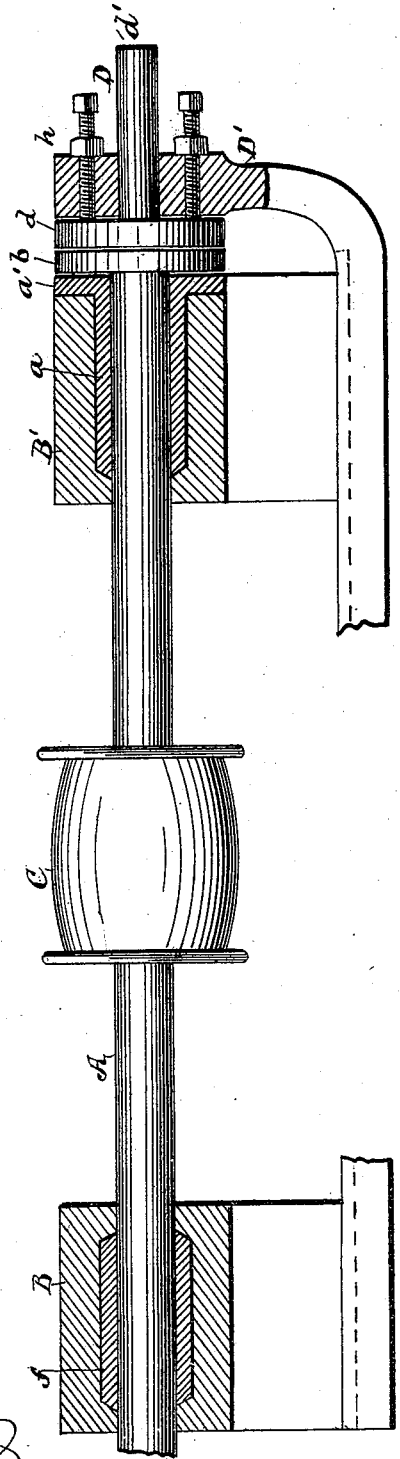
WITNESSES:
INVENTOR:
Theo. A. Cook.
BY H. A. West
ATTORNEY.

UNITED STATES PATENT OFFICE.

THEODORE A. COOK, OF CALLICOON DEPOT, ASSIGNOR TO JAMES MATHISON AND WALTER MATHISON, OF BROOKLYN, NEW YORK.

SHAFT AND BEARING.

SPECIFICATION forming part of Letters Patent No. 501,611, dated July 18, 1893.

Application filed November 3, 1891. Serial No. 410,719. (No model.)

*To all whom it may concern:*

Be it known that I, THEODORE A. COOK, a citizen of the United States, and a resident of Callicoon Depot, in the county of Sullivan and State of New York, have invented certain new and useful Improvements in Shafts and Bearings, of which the following is a specification.

My invention relates to shafts, and more particularly to rapidly turning shafts or spindles, and to the bearings therefor; and the object of my invention is to provide effective means to prevent the vibration and trembling particularly in spindles used in wood working and other machinery to which cutting tools are attached and run at high speed.

Reference is to be had to the accompanying drawing forming a part of this specification in which the figure is a sectional elevation of a shaft or spindle and bearings therefor made in accordance with my invention.

A represents a shaft or spindle mounted in bearings B, B' and provided with a pulley C. The bearing B may be of any ordinary construction and as here shown is lined with Babbitt-metal or other soft lining $f$. The bearing B' is of usual construction save that the Babbitt-metal or other soft lining $a$ is formed with a flange $a'$ which fits against one end of the bearing as shown. The shaft or spindle A is formed at the end with a flat and true surface to receive a like surface formed on the follower D. The shaft is by preference formed with a flange, collar, $b$, to furnish a broad contact surface for the follower, and also to run in contact with the ring or flange $a'$ of the Babbitt-lining $a$. The follower D is formed with a stem $d'$ which passes through the auxiliary bearing D' which serves to firmly hold the follower, and in this auxiliary bearing are fitted adjusting screws $h$ by which the follower may be set up in contact with the end of the shaft. In this manner the lateral jar and vibration of the shaft when in operation may be counteracted in a large degree and the shaft or spindle made to run true and steady, and the durability of the bearing is much greater than with common bearings. The follower should be made of Babbitt or other soft metal to prevent wear or friction and the auxiliary bearing D' may be movable to enable the shaft or spindle to be placed in and removed from its bearings.

Having thus described my invention, what I claim as new, and desire to secure by Letters Patent, is—

The bearing B' provided with a lining $a$ formed with a flat faced outer flange $a'$, in combination with a shaft A formed at its end with a flange $b$ of greater diameter than the shaft, and an adjustable follower D held in an auxiliary bearing and adapted to firmly hold the flange $b$ against the flange $a'$ substantially as and for the purposes set forth.

THEODORE A. COOK.

Witnesses:
BENJAMIN S. WARD,
JOHN W. LONG.